(12) United States Patent
Gorzynski et al.

(10) Patent No.: US 7,911,955 B2
(45) Date of Patent: Mar. 22, 2011

(54) COORDINATED MEDIA CONTROL SYSTEM

(75) Inventors: Mark E Gorzynski, Corvallis, OR (US);
Ted W Beers, Corvallis, OR (US);
Michael D Derocher, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 11/700,330

(22) Filed: Jan. 31, 2007

(65) Prior Publication Data
US 2008/0181218 A1  Jul. 31, 2008

(51) Int. Cl.
*H04L 12/26* (2006.01)
*H04L 12/28* (2006.01)
*H04L 12/16* (2006.01)
*H04L 12/56* (2006.01)
*G06F 13/14* (2006.01)
*G06F 15/16* (2006.01)
*G06F 15/177* (2006.01)
*G06F 15/173* (2006.01)

(52) U.S. Cl. ......... 370/235; 370/254; 370/260; 370/400; 345/520; 709/204; 709/220; 709/223

(58) Field of Classification Search ................ 370/400, 370/251–271, 235; 345/520; 709/204, 220, 709/223
See application file for complete search history.

(56) References Cited

U.S. PATENT DOCUMENTS

| | | |
|---|---|---|
| 5,007,046 A | 4/1991 | Erving et al. |
| 5,058,153 A | 10/1991 | Carew et al. |
| 5,617,539 A | 4/1997 | Ludwig et al. |
| 5,689,641 A | 11/1997 | Ludwig et al. |
| 5,758,079 A | 5/1998 | Ludwig et al. |
| 5,802,294 A | 9/1998 | Ludwig et al. |
| 5,844,600 A | 12/1998 | Kerr |
| 5,848,098 A | 12/1998 | Cheng et al. |
| 5,884,039 A | 3/1999 | Ludwig et al. |
| 5,915,091 A | 6/1999 | Ludwig et al. |
| 6,014,135 A | 1/2000 | Fernandes |
| 6,078,809 A | 6/2000 | Proctor |
| 6,128,649 A | 10/2000 | Smith et al. |
| 6,148,068 A | 11/2000 | Lowery et al. |
| 6,212,547 B1 | 4/2001 | Ludwig et al. |
| 6,237,025 B1 | 5/2001 | Ludwig et al. |
| 6,300,973 B1 | 10/2001 | Feder et al. |
| 6,327,276 B1 | 12/2001 | Robert et al. |
| 6,532,218 B1 | 3/2003 | Shaffer et al. |
| 6,535,604 B1 | 3/2003 | Provencal et al. |
| 6,560,707 B2 | 5/2003 | Curtis et al. |
| 6,590,604 B1 | 7/2003 | Tucker et al. |
| 6,658,450 B1 | 12/2003 | Balakrishnan et al. |
| 6,690,654 B2 | 2/2004 | Elliott et al. |
| 6,769,013 B2 | 7/2004 | Frees et al. |
| 6,989,856 B2 | 1/2006 | Firestone et al. |
| 7,012,891 B1 | 3/2006 | Chandran et al. |
| 7,024,456 B1 | 4/2006 | Simonoff |
| 7,043,528 B2 | 5/2006 | Schmitt et al. |
| 7,047,279 B1 | 5/2006 | Beams et al. |
| 7,054,904 B2 | 5/2006 | Ludwig et al. |

(Continued)

*Primary Examiner* — Alpus H Hsu
*Assistant Examiner* — Saad Hassan

(57) ABSTRACT

A coordinated media control system includes a node manager, a device control system, and a device. The node manager is operatively connected to a first node. The device control system is operatively connected to the node manager. The device is operatively connected to the device control system. The node manager is configured to establish and coordinate media streams for transmitting media from the device to a second node or for receiving media to the device from the second node.

20 Claims, 2 Drawing Sheets

U.S. PATENT DOCUMENTS

| | | |
|---|---|---|
| 7,069,234 B1 | 6/2006 | Cornelius et al. |
| 7,075,919 B1 | 7/2006 | Wendt et al. |
| 2002/0149617 A1 | 10/2002 | Becker |
| 2003/0120690 A1 | 6/2003 | Schaeffer et al. |
| 2003/0158901 A1 | 8/2003 | Ludwig et al. |
| 2003/0187940 A1 | 10/2003 | Ludwig et al. |
| 2003/0191848 A1 | 10/2003 | Hesselink et al. |
| 2003/0195994 A1 | 10/2003 | Burgess et al. |
| 2003/0225832 A1 | 12/2003 | Ludwig |
| 2004/0103152 A1 | 5/2004 | Ludwig et al. |
| 2004/0143629 A1 | 7/2004 | Bodin et al. |
| 2004/0215784 A1 | 10/2004 | Qi et al. |
| 2005/0030580 A1 | 2/2005 | Moroi |
| 2005/0044233 A1 | 2/2005 | Cai et al. |
| 2005/0055642 A1 | 3/2005 | Chen et al. |
| 2005/0071427 A1 | 3/2005 | Dorner et al. |
| 2005/0071440 A1 | 3/2005 | Jones et al. |
| 2005/0114475 A1 | 5/2005 | Chang et al. |
| 2005/0132299 A1 | 6/2005 | Jones et al. |
| 2005/0198121 A1 | 9/2005 | Daniels et al. |
| 2005/0216847 A1 | 9/2005 | Zhu et al. |
| 2005/0262201 A1 | 11/2005 | Rudolph et al. |
| 2006/0010197 A1* | 1/2006 | Ovenden ................ 709/204 |
| 2006/0041580 A1* | 2/2006 | Ozdemir et al. ........ 707/102 |
| 2006/0059266 A1 | 3/2006 | Ludwig et al. |
| 2006/0064461 A1 | 3/2006 | Ludwig et al. |
| 2006/0123347 A1 | 6/2006 | Hewitt et al. |
| 2006/0143295 A1* | 6/2006 | Costa-Requena et al. .... 709/227 |
| 2006/0161651 A1 | 7/2006 | Ardulov et al. |
| 2006/0187926 A1* | 8/2006 | Imai et al. .............. 370/389 |
| 2006/0195524 A1 | 8/2006 | Nichols et al. |
| 2006/0195539 A1 | 8/2006 | Nichols et al. |
| 2006/0209810 A1* | 9/2006 | Krzyzanowski et al. ...... 370/356 |
| 2007/0250822 A1* | 10/2007 | Yang et al. ............ 717/143 |
| 2007/0266128 A1* | 11/2007 | Bhogal et al. .......... 709/223 |
| 2008/0031161 A1* | 2/2008 | Osthus et al. .......... 370/261 |
| 2008/0071834 A1* | 3/2008 | Bishop .................. 707/104.1 |
| 2008/0137534 A1* | 6/2008 | Chilukoor et al. ....... 370/232 |

* cited by examiner

COORDINATED MEDIA CONTROL SYSTEM

CROSS-REFERENCE TO RELATED APPLICATIONS

This patent application is related to copending patent application Ser. No. 11/700,331, entitled "Device Control System," filed concurrently with and assigned to the same assignee as the present application, the disclosure of which is incorporated herein by reference.

BACKGROUND

Media devices are commonly used to facilitate communications between remote users. Exemplary media devices include fax machines, video cameras, telephones, printers, scanners, displays, personal computers, microphones, speakers, and other suitable devices for facilitating communications. Each media device typically includes its own interface and control system. Further, different brands and models of the same type of media device may differ in their interface and control systems. The functionality available may also differ even on the same type of media device.

Communications between remote users are typically enhanced by utilizing a plurality of media devices together in a collaborative environment. However, coordinating among the differing interface and control systems of the various media devices can be, amongst other things, complex, time-consuming, and expensive. Having differing interface and control systems can further interfere with the accuracy, expediency and efficiency of the communications process.

For these and other reasons, there is a need for the present invention.

SUMMARY

One embodiment of the invention provides a coordinated media control system. The coordinated media control system includes a node manager, a device control system, and a device. The node manager is operatively connected to a first node. The device control system is operatively connected to the node manager. The device is operatively connected to the device control system. The node manager is configured to establish and coordinate media streams for transmitting media from the device to a second node or for receiving media to the device from the second node.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention provide systems and methods for establishing an environment employing a plurality of devices. In one embodiment, the environment is a collaborative environment. In one embodiment, the plurality of devices are locally and remotely coordinated by establishing media stream correspondences between the devices.

As used herein, the term "media" includes text, video, sounds, images, or other suitable digital data capable of being transmitted over a network.

As used herein, the term "node device" includes processor-based devices, input/output devices, or other suitable devices for facilitating communications between remote users. Examples of node devices include fax machines, video cameras, telephones, printers, scanners, displays, personal computers, microphones, and speakers.

As used herein, the term "node" includes any suitable environment or system configured to transmit and/or receive media via one or more node devices. In one embodiment, the environment is a collaborative environment, which enables remote users to share media across one or more node devices. A collaborative environment will enable, for example, a presenter to simultaneously give a multimedia presentation to an audience not only in the presenter's location but also in one or more remote locations. The collaborative environment may further enable the audience in the remote locations to participate in the presentation as the audience in the presenter's location would participate (e.g., ask questions to the presenter).

As used herein, the term "event" refers to a connection of a plurality of nodes such that one or more node devices of one node are configured to transmit media to and/or receive media from one or more node devices of another node.

Figure 1:
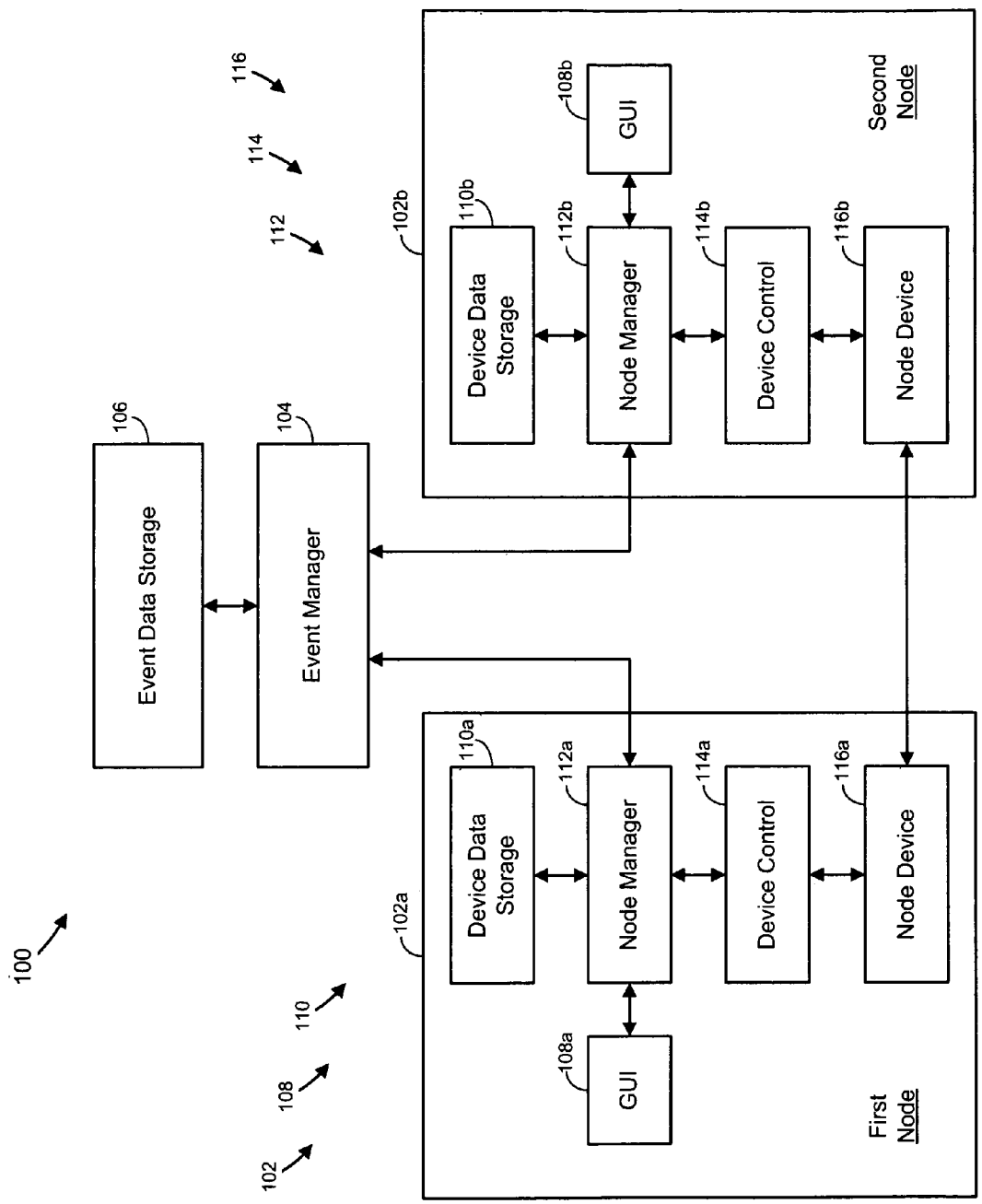
FIG. 1 illustrates a block diagram of a coordinated media control system in accordance with one embodiment.

FIG. 1 illustrates a block diagram of a coordinated media control system 100 in accordance with one embodiment. Coordinated media control system 100 includes a first node 102a, a second node 102b, an event manager 104, and an event data storage 106. First node 102a and second node 102b are collectively referred to as nodes 102. While the illustrated embodiment depicts two nodes 102, coordinated media control system 100 includes any suitable number of nodes 102 in other embodiments.

First node 102a includes a graphical user interface (GUI) 108a, a device data storage 110a, a node manager 112a, a device control system 114a, and a node device 116a. Second node 102b includes a graphical user interface (GUI) 108b, a device data storage 110b, a node manager 112b, a device control system 114b, and a node device 116b. GUI 108a and GUI 108b are collectively referred to as GUIs 108. Device data storage 114a and device data storage 110b are collectively referred to as device data storages 110. Node manager 112a and node manager 112b are collectively referred to as node managers 112. Device control system 114a and device control system 114b are collectively referred to as device control systems 114. Node device 116a and node device 116b are collectively referred to as node devices 116.

Event manager 104 is operatively connected to event data storage 106 and node managers 112. Node manager 112a is operatively connected to GUI 108a, device data storage 110a, and device control system 114a. Node manager 112b is operatively connected to GUI 108b, device data storage 110b, and device control system 114b. Node device 116a is operatively connected to device control system 114a and node device 116b, which is operatively connected to device control system 114b. In one embodiment, one or more components of coordinated media control system 100 are operatively connected via one or more suitable computer networks, such as a local area network (LAN) or the Internet. In one embodiment, one or more components of coordinated media control system 100 communicate via one or more suitable network protocols, such as TCP/IP.

In one embodiment, event manager 104 is configured to manage information describing the state of an event. Examples of information describing the state of an event include the identity of nodes 102 and node devices 116 participating in an event, the relationships among nodes 102 and node devices 116, the intent or manner in which each node 102 and node device 116 is participating, and the capabilities of each node 102 and node device 116. In another embodiment, event manager 104 is also configured to instruct nodes 102 to operate in accordance with event management policies stored in event data storage 106.

Event management policies include any suitable conditions or restrictions for creating, executing, and terminating an event. Examples of event management policies include the number of nodes 102 permitted to join an event, the types of nodes 102 permitted to join an event, and data relating to the progress of the event (e.g., duration of an event, available bandwidth). The operation and configuration of event manager 104 is described in greater detail in Ser. No. 11/497,886 entitled "System and Method for Managing Virtual Collaboration Systems," filed Aug. 2, 2006 and assigned to the same assignee as the present application, the disclosure of which is incorporated herein by reference.

Node managers 112 are configured to establish and coordinate media streams for transmitting media between node devices 116. As illustrated in the embodiment of FIG. 1, node managers 112 operate in accordance with instructions received from attendees via GUIs 108 and in accordance with the event management policies provided by event manager 104. In one embodiment, GUIs 108 provide a user interface enabling attendees to create, execute, and terminate events between nodes 102. GUIs 108 include any suitable input/output devices, such as a mouse and a display, for communicating with node managers 112. In one embodiment, each of node devices 116 further includes its own GUI (not shown).

In one embodiment, GUIs 108 provide attendees with a natural and logical environment for coordinating node devices 116. In particular, GUIs 108 allow attendees to operate node devices 116 for sharing media streams without the need for specific knowledge of the interface for each node device 116. For example, if the attendee in first node 102a desires to share image data recorded from an overhead camera in first node 102a, the attendee is able to control functions of the camera, such as zoom and focus, through GUI 108a without the need for specific knowledge regarding the brand or model of the camera. Further, the attendee is unburdened with the complications of establishing media connections among a plurality of node devices 116 with different interfaces. For example, if an attendee in first node 102a desires to share image data from an overhead camera in first node 102a to a display in second node 102b, the attendee is able to select the overhead camera and the display through GUI 108a.

In one embodiment, node managers 112 configure and control node devices 116 in accordance with node information stored in device data storages 110. Node information includes any suitable configuration and control information specific to the particular nodes in which device data storages 110 are located. Examples of node information include the state of the nodes 102 (e.g., online or unavailable), event participation configuration and control data (e.g., the manner and priority in which a node 102 can participate in an event), node device configuration and control data (e.g., command sequences for operating node devices 116), and user interface data (e.g., the default language of GUIs 108). In one embodiment, only node manager 112a or other components within first node 102a is permitted to access device data storage 110a. In one embodiment, only node manager 112b or other components within second node 102b is permitted to access device data storage 110b.

In one embodiment, the node information related to first node 102a and node device 116a is stored in device data storage 110a and managed by device control system 114a. In one embodiment, the node information related to second node 102b and node device 116b is stored in device data storage 110b and managed by device control system 114b.

In one embodiment, device control systems 114 provide node managers 112 with an abstracted interface to node devices 116. The control commands are "abstracted" because the user does not need to have specific knowledge (e.g., brand, model, firmware version) of node devices 116 to operate them. Device control systems 114 are described in greater detail in above-reference Ser. No. 11/700,331, entitled "Device Control System," filed concurrently with and assigned to the same assignee as the present application.

Figure 2:
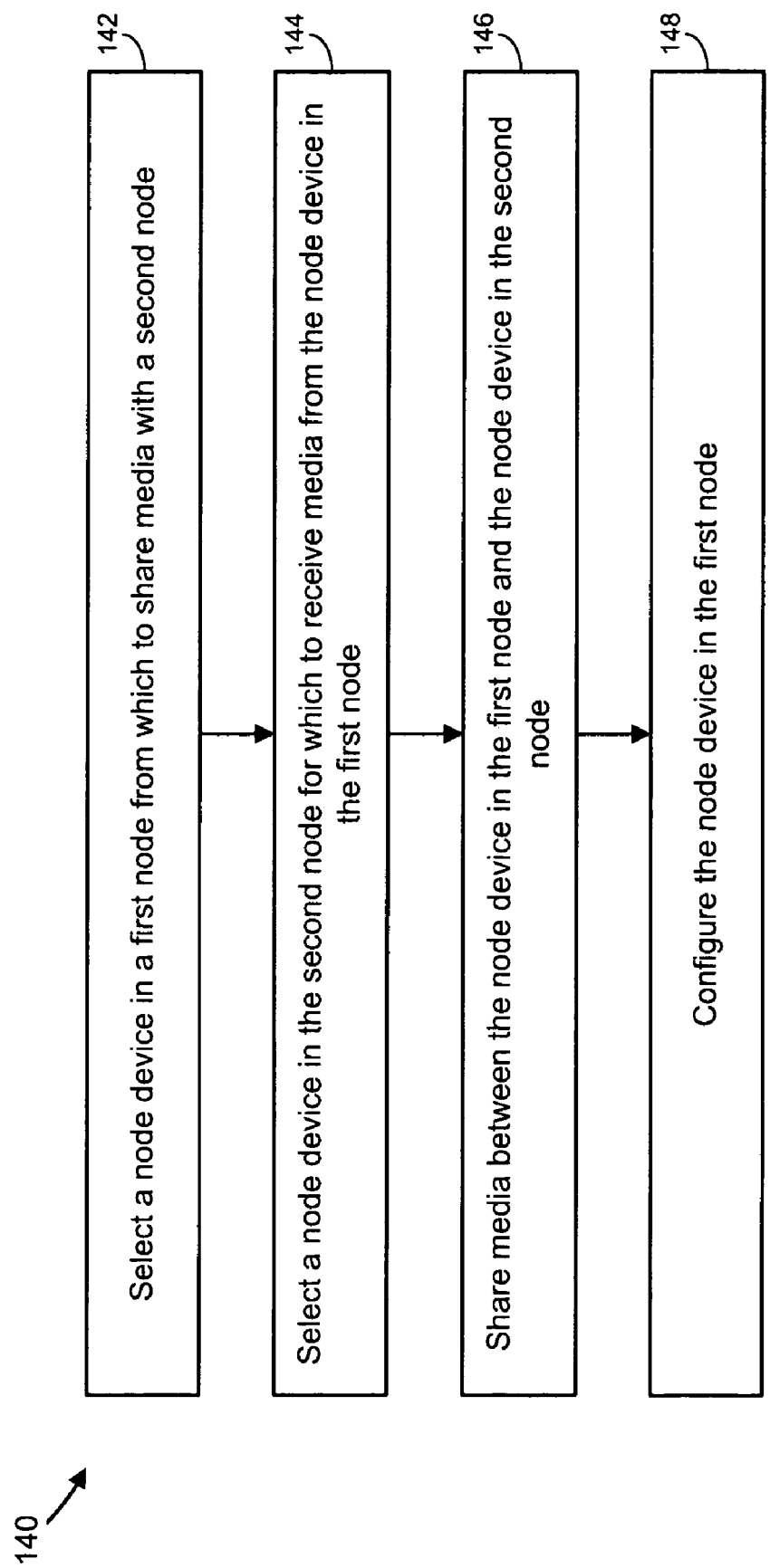
FIG. 2 illustrates a flow diagram illustrating one embodiment of a method of establishing and sharing a media stream from a first node to a second node.

FIG. 2 illustrates a flow diagram illustrating one embodiment of a method 140 of establishing and sharing media from (receiving media to) first node 102a to (or from) second node 102b. With reference to FIG. 1, using GUI 108a, an attendee selects (at 142) a node device 116a in first node 102a for which to share media from (or receive media to) node device 116a. In one example, if the attendee desires to share the image from an overhead camera, the attendee selects a camera icon among a plurality of icons shown on GUI 108a. The attendee selects (at 144) a node device 116b in second node 102b for which to receive the media from (or to send the media to) node device 116a. In one example, if the attendee desires for a display to show an image from an overhead camera shared by node device 116a, the attendee selects a display icon among a plurality of icons shown on GUI 108a.

The attendee shares (at 146) the media between the selected node devices 116. In one example, the attendee selects a share icon among a plurality of icons shown on GUI 108a to share the media from node device 116a to node device 116b. The attendee configures (at 148) node device 116a. In one example, the attendee adjusts the focus and zoom of an overhead camera using GUI 108a. In one embodiment, the attendee configures (at 148) node device 116 prior to sharing (at 146) the media. In another embodiment, the attendee configures (at 148) node 116 while sharing (at 146) the media.

Embodiments described and illustrated with reference to the Figures provide systems and methods for coordinated media control. It is to be understood that not all components and/or steps described and illustrated with reference to the Figures are required for all embodiments. In some embodiments, at least a portion of the system includes an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A coordinated media control system comprising:
    a plurality of nodes, including a first node and a second node, where each of the first node and the second node comprises:
        a node manager;
        a plurality of devices that are separate from and different than the node manager and that are communicatively connected to the node manager, where at least some of the devices at the first node are communicatively connected to at least some of the devices at the second node, where the first node enables a user at the first node to select a first device from the plurality of devices of the first node that are communicatively connected to the node manager of the first device and to select a second device from the plurality of devices of the second node that are communicatively connected to the node manager of the second device between which a media stream is to be established; and,
    an event manager device separate from and different than the nodes and separate from and different than the devices of the nodes, the event manager device communicatively connected to the node manager of each node,
    wherein the node managers of the first and the second nodes communicate with the event manager device to establish a media stream between the first and the second devices, such that the node managers of the first and the second nodes do not communicate directly with one another to establish the media stream between the first and the second devices,
    wherein upon the media stream being established via the node managers of the first and the second nodes communicating with the event manager device, the media stream is directly communicated between the first and the second devices without the media stream passing through the event manager device,
    and wherein communication between the first and the second devices does not pass through any other node and does not pass through the event manager device.

2. The coordinated media control system of claim 1, wherein each node of the plurality of nodes further comprises:
    a device data storage operatively connected to the node manager and configured to store configuration and control information regarding at least the devices of the node.

3. The coordinated media control system of claim 2, wherein the configuration and control information comprises event participation configuration and control information.

4. The coordinated media control system of claim 1, wherein each node of the plurality of nodes further comprises:
    a graphical user interface (GUI) operatively connected to the node manager, the GUI configured to enable a user of the node to enter commands to establish and coordinate media streams with other nodes via the event manager device.

5. The coordinated media control system of claim 4, wherein the GUI of each node permits the user to select a given device of the node from the plurality of devices of the node.

6. The coordinated media control system of claim 1, wherein the event manager device is configured to establish media streams among the nodes in accordance with a policy.

7. The coordinated media control system of claim 6, further comprising an event data storage operatively connected to the event manager and configured to store the policy.

8. The coordinated media control system of claim 1, wherein the event manager device is configured to describe a state of each node in accordance with an event.

9. The coordinated media control system of claim 1, wherein each node of the plurality of nodes comprises:
    a device control subsystem separate from and different than the node manager of the node and interconnecting the devices of the node with the node manager of the node, to provide an abstracted interface of the devices of the node to the node manager of the node.

10. The coordinated media control system of claim 1, wherein the devices of each node each comprises one of: a fax machine, a video camera, a telephone, a printer, a scanner, a display, a personal computer, a microphone, and a speaker.

11. A method for establishing and communicating a media stream between a first device of a first node and a second device of a second node of a plurality of nodes, each node having a device, the method comprising:
    receiving, from a user at the first node, selection of the first device from a plurality of devices of the first node and the second device from a plurality of devices of the second node between which the media stream is to be established, the plurality of devices at the first node communicatively connected to a first node manager of the first node and the plurality of devices at the second node communicatively connected to a second node manager of the second node;
    communicating, by each of the first node manager of the first node and the second node manager of the second node, with an event manager device to establish the media stream, where the event manager device is separate from and different than the plurality of devices of each of the first and the second nodes and is communicatively connected to the first node manager of the first node and to the second node manager of the second node, and such that the first and the second node managers of the first and the second nodes do not communicate directly with one another to establish the media stream between the first and the second devices; and,
    communicating the media stream directly between the first and the second devices of the first and the second nodes without the media streaming passing through the event manager device, and where communication between the first and the second devices of the first and the second nodes does not pass through any other node and does not pass through the event manager device.

12. The method of claim 11, further comprising permitting a user to establish and coordinate the media stream between the first node the second nodes via a graphical user interface (GUI) at each of the first and the second nodes.

13. The method of claim 11, wherein the event manager device is configured to establish media streams among the nodes in accordance with a policy.

14. A node of a coordinated media control system, comprising:
   a plurality of devices, at least some of which are communicatively connectable to other devices of other nodes of the coordinated media control system, where the node enables a user at the node to select a first device from the plurality of devices of the node and to select a second device from the plurality of other devices of the other nodes between which a media stream is to be established; and,
   a node manager to communicate with an event manager device separate from and different than the node and the other nodes of the coordinated media control system, to establish a media stream between the first and the second devices, the devices of the node being communicatively connected to the node manager
   such that the node manager of the node does not communicate directly with a node manager of the given other node to establish the media stream,
   wherein upon the media stream being established, the media stream is directly communicated between the first and the second devices without the media stream passing through the event manager device,
   wherein the devices are separate from and different than the node manager,
   and wherein communication between the first device and the second device does not pass through any other node and does not pass through the event manager device.

15. The node of claim 14, further comprising a device data storage operatively connected to the node manager and configured to store configuration and control information regarding at least the devices of the node.

16. The node of claim 15, wherein the configuration and control information comprises event participation configuration and control information.

17. The node of claim 14, further comprising a graphical user interface (GUI) operatively connected to the node manager, the GUI configured to enable a user of the node to enter commands to establish and coordinate media streams with the other nodes via the event manager device.

18. The node of claim 17, wherein the GUI permits the user to select the first device of the node from the plurality of devices of the node.

19. The node of claim 14, further comprising a device control subsystem separate from and different than the node manager of the node and interconnecting the devices of the node with the node manager of the node, to provide an abstracted interface of the devices of the node to the node manager of the node.

20. The node of claim 14, wherein the devices of the node each comprises one of: a fax machine, a video camera, a telephone, a printer, a scanner, a display, a personal computer, a microphone, and a speaker.

* * * * *

UNITED STATES PATENT AND TRADEMARK OFFICE
CERTIFICATE OF CORRECTION

| | | |
|---|---|---|
| PATENT NO. | : 7,911,955 B2 | Page 1 of 1 |
| APPLICATION NO. | : 11/700330 | |
| DATED | : March 22, 2011 | |
| INVENTOR(S) | : Mark E Gorzynski et al. | |

It is certified that error appears in the above-identified patent and that said Letters Patent is hereby corrected as shown below:

In column 6, line 44, in Claim 11, delete "node and" and insert -- node, and --, therefor.

Signed and Sealed this
Twenty-eighth Day of June, 2011

David J. Kappos
*Director of the United States Patent and Trademark Office*